June 17, 1947.    R. C. SIGHTS    2,422,441
HELICOPTER
Filed Aug. 16, 1943    4 Sheets-Sheet 1
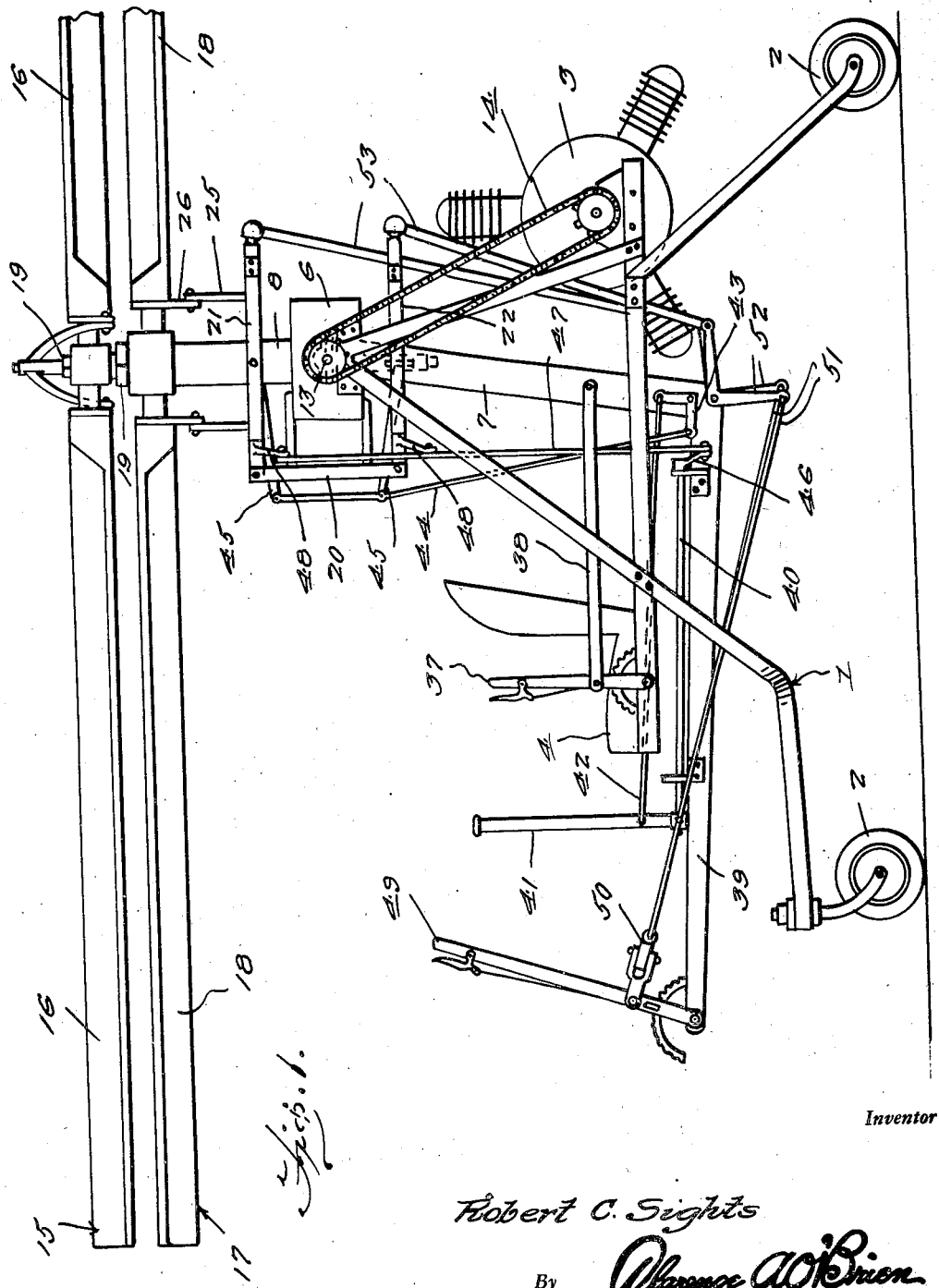
Inventor
Robert C. Sights
By Clarence A. O'Brien
and Harvey B. Jacobson
Attorneys

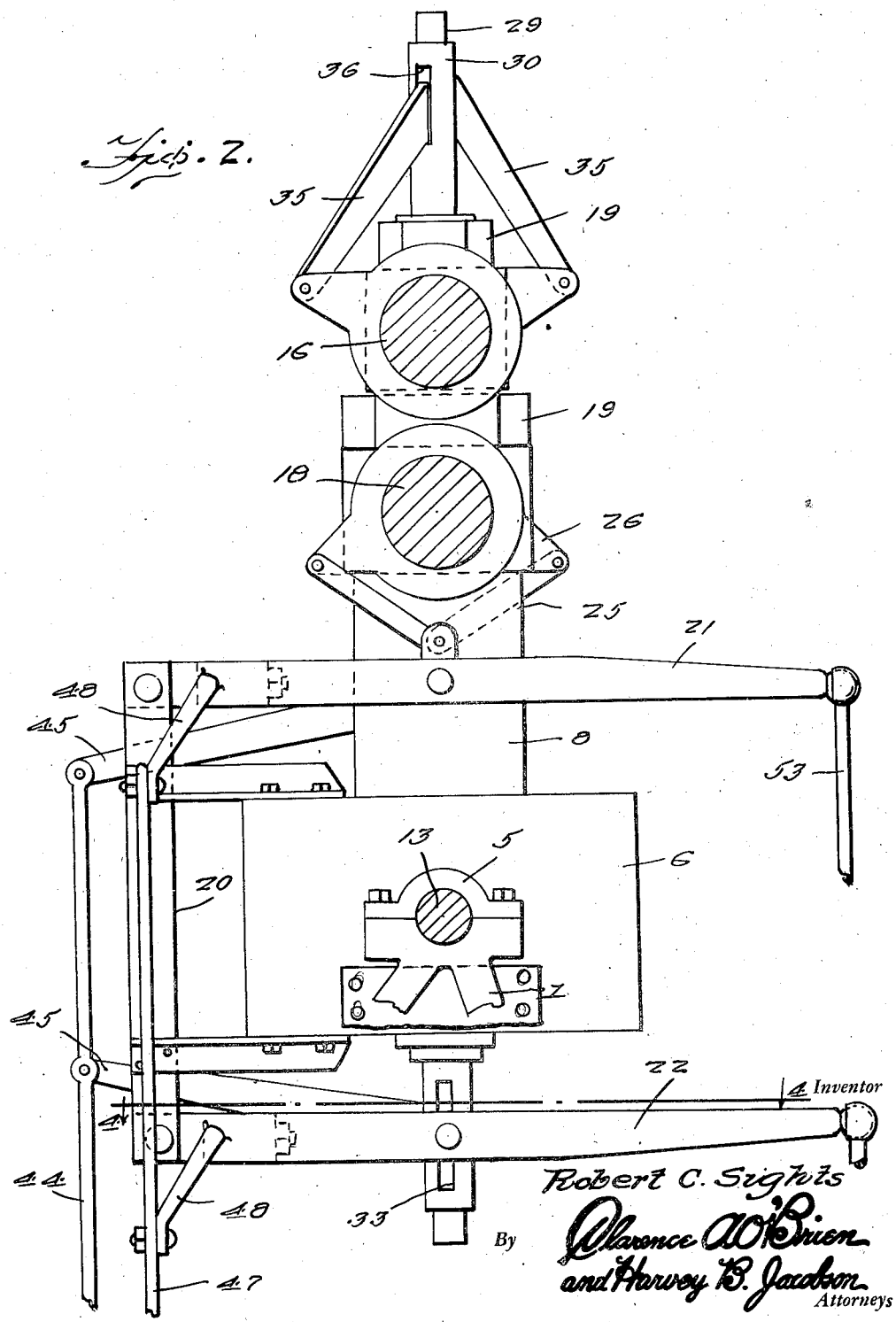

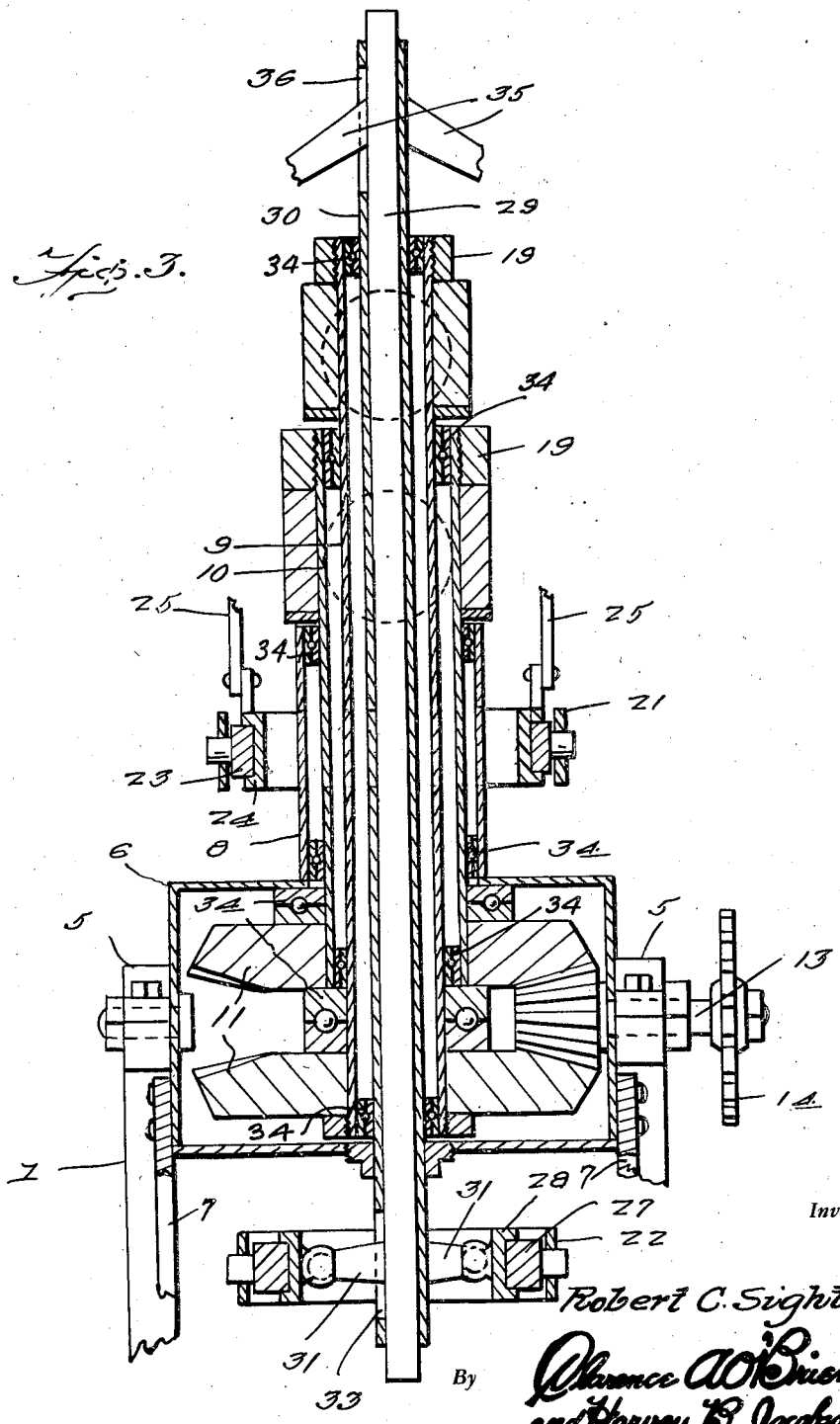

June 17, 1947. R. C. SIGHTS 2,422,441
HELICOPTER
Filed Aug. 16, 1943 4 Sheets-Sheet 4
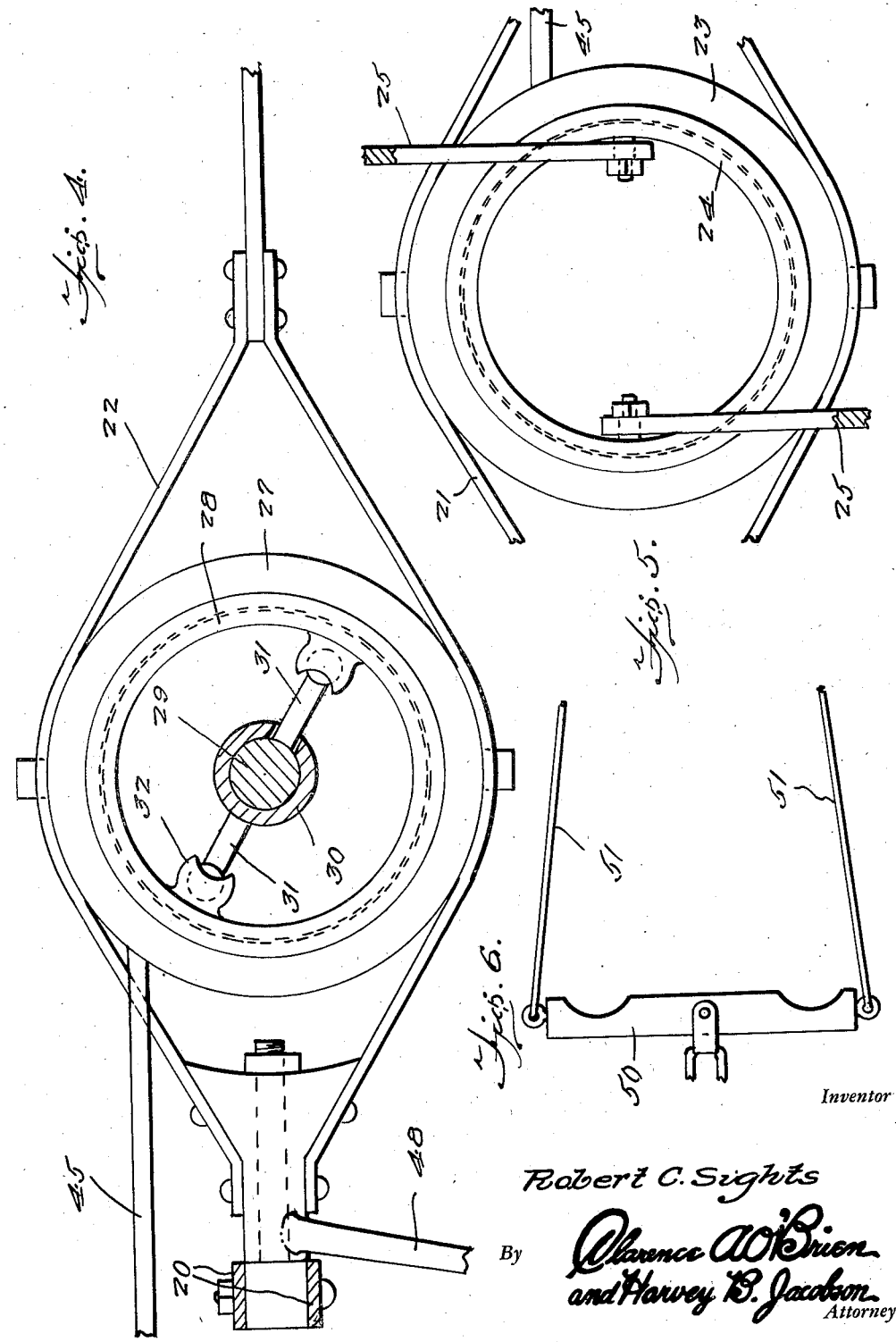
Inventor
Robert C. Sights Patented June 17, 1947

2,422,441

UNITED STATES PATENT OFFICE 2,422,441

HELICOPTER

Robert C. Sights, Kennewick, Wash.

Application August 16, 1943, Serial No. 498,811

2 Claims. (Cl. 244—17)

The present invention relates to new and useful improvements in heavier-than-air flying machines of the helicopter type comprising a pair of oppositely turning upper and lower rotors.

An important object of the invention is to provide, in a manner as hereinafter set forth, a flying machine of the aforementioned character comprising novel means for tilting the rotors in unison in a vertical plane for causing the machine to hover or move forwardly or rearwardly at various speeds.

Another important object of the invention is to provide a helicopter of the character described which embodies a unique arrangement for feathering the blades of the rotors at any desired point in the travel thereof for tilting the machine and for causing same to move in any direction when in flight.

Still another important object of the invention is to provide a helicopter wherein the pitch of the blades of either rotor may be increased while the pitch of the blades of the other rotor is decreased and vice versa for varying the relative torque, whereby the machine may readily be turned in any direction.

Still another important object of the invention is to provide a helicopter of the character set forth in which all of the blades may be simultaneously feathered for varying the lift of the rotors.

Other objects of the invention are to provide a helicopter which will be comparatively simple in construction, strong, durable, highly efficient and reliable in operation, compact, and which may be manufactured at low cost.

All of the foregoing, and still further objects and advantages of the invention will become apparent from a study of the following specification, taken in connection with the accompanying drawing wherein like characters of reference designate corresponding parts throughout the several views, and wherein:

Figure 1 is a view in side elevation of a helicopter constructed in accordance with the present invention.

Figure 2 is a view in side elevation of the rotor-supporting and actuating mechanism, showing the drive shaft and the blade shafts in cross-section.

Figure 3 is a view in vertical section through the mechanism shown in Figure 2.

Figure 4 is a view in horizontal section, taken substantially on the line 4—4 of Figure 2.

Figure 5 is a top plan view of the adjusting means for the lower blades.

Figure 6 is a top plan view of the foot bar for varying the torque of the rotors relative to each other.

Referring now to the drawing in detail, it will be seen that the embodiment of the invention which has been illustrated comprises a frame structure 1 which is provided with suitable landing wheels 2. An engine 3 is mounted on the rear portion of the frame structure 1. Mounted on the forward portion of the frame structure 1 is a pilot's seat 4.

Journaled for rotation between transversely aligned bearings 5 on the upper portion of the frame structure 1 is a gear case 6. An angular beam 7 is fixed on the gear case 6 and extends downwardly and then forwardly therefrom adjacent the seat 4.

Fixed on the gear case and rising therefrom is a tubular housing 8 which communicates with said gear case. Tubular inner and outer shafts 9 and 10, respectively, are rotatably mounted in the housing 8. The shafts 9 and 10 extend downwardly into the case 6 and have fixed thereon opposed, beveled gears 11. A beveled pinion gear 12 on a shaft 13 drives the gears 11 in opposite directions. The shaft 13 is driven from the engine by a chain and sprocket connection 14.

The inner shaft 9 extends above the outer shaft 10 and has fixed on its upper portion a rotor 15 comprising feathering blades 16. The outer shaft 10 extends above the tubular housing 8 and has fixed on its upper portion a rotor 17 comprising feathering blades 18. Retaining nuts 19 are provided on the upper end portions of the shafts 9 and 10 for the rotors 15 and 17.

Vertical supports 20 are mounted on the gear case 6 forwardly thereof. Upper and lower frames 21 and 22, respectively, are mounted for vertical swinging and rocking movement between the upper and lower end portions of the supports 20. The frame 21 encircles the tubular housing 8.

As illustrated to advantage in Figure 5 of the drawings, a gimbal ring 23 is pivotably mounted in the upper frame 21. Rotatably mounted in the gimbal ring 23 is an inner ring 24. Links 25 connect the ring 24 to arms 26 on the inner portions of the lower blades 18 for feathering said lower blades.

A gimbal ring 27 is journaled in the lower frame 22. An inner ring 28 is rotatably mounted in the gimbal ring 27. Extending through the tubular inner shaft 9 is a vertically slidable rod 29 which projects downwardly into the ring 28. A sleeve 30 is slidable on the rod 29. Arms 31 connect the members 29 and 30 to the ring 28 for vertical adjustment thereby. As best seen in Figure 4 of the drawing, ball and socket joints 32 connect the arms 31 to the ring 28. A vertical slot 33 in the lower portion of the sleeve 30 accommodates the arm 31 which projects from the rod 29. Suitable bearings 34 are provided for the members 9, 10, 30, 11, et cetera. Arms 35 connect the upper rotor blades 16 to the upper portions of the members 29 and 30 for feathering thereby. A vertical slot 36 in the upper portion of the sleeve 30 accommodates the arm 35 which projects from the rod 29.

A hand lever 37 is mounted on the forward portion of the frame structure 1 adjacent the seat 4. A rod 38 operatively connects the lever 37 to the beam 7 for tilting the rotors 15 and 17 forwardly or rearwardly.

Rotatably mounted on the forwardly projecting portion 39 of the beam 7 is a longitudinal shaft 40. A hand lever 41 is mounted for forward and rearward swinging movement only on the forward end portion of the shaft 40. A rod 42 connects the hand lever 41 to one end portion of a bell crank lever 43 on the beam 7. A rod 44 connects the other end portion of the bell crank lever 43 to arms 45 which are fixed on the gimbal rings 23 and 27.

Fixed on the rear end portion of the shaft 40 is an arm 46. A rod 47 operatively connects the arm 46 to arms 48 which project laterally from the frames 21 and 22 at the pivoted forward ends thereof.

A hand lever 49 is pivotally mounted on the forward end of the portion 39 of the angular beam 7. Pivotally mounted at an intermediate point on the lower portion of the lever 49 is a foot bar 50. Rods 51 connect the opposite ends of the foot bar 50 to one end portion of bell crank levers 52 which are mounted on the beam 7. Rods 53 connect the other end portions of the bell crank levers 52 to the free rear ends of the frames 21 and 22.

It is thought that the operation of the machine will be readily apparent from a consideration of the foregoing. Briefly, the operator, sitting on the seat 4, actuates the lever 37 for tilting the upper and lower rotors 15 and 17, respectively, forwardly or rearwardly for causing the machine to hover, or move forwardly or rearwardly and to control the speed thereof. Longitudinal swinging movement of the lever 41 rocks the gimbal rings 23 and 27 for feathering the blades at the front and rear, while lateral swinging movement of said lever 41 rocks the frames 21 and 22 laterally for feathering the blades 16 and 18 at the sides of the machine. Feathering of the blades 16 and 18 at any desired point in their travel may be had by a compound movement of the level 41 for simultaneously rocking the frames 21 and 22 and the gimbal rings 23 and 27 therein. Thus, the machine may be caused to move in any direction. Operation of the lever 49 swings the frames 21 and 22 upwardly or downwardly in unison for changing the pitch of the blades 16 and 18 for varying the lift of the rotors 15 and 17. Operation of the foot bar 50 on the lever 49 swings the frames 21 and 22 in opposite directions for increasing the pitch of the blades of one of the rotors while decreasing the pitch of the blades of the other of said rotors. In this manner the relative torque is varied so that the machine may be readily turned in any direction. A suitable cabin or fuselage may be provided on the frame structure 1.

It is believed that the many advantages of a helicopter constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:

1. In a helicopter, upper and lower rotors having feathering blades, means for supporting and driving said rotors in opposite directions including gears having a gear case, vertically swingable and rockable frames mounted on and respectively arranged above and below the gear case, gimbal rings pivotally mounted in the frames, externally grooved inner rings rotatable within the gimbal rings, said gimbal rings being fitted in the external grooves of the inner rings, operative connections between the inner rings and the blades of the respective rotors, and means to selectively rock or swing or rock and swing said frames to feather the blades at the front and rear or at the sides of the machine or to feather said blades at any desired point in their travel, and means to selectively swing said frames in the same direction to simultaneously change the pitch of the blades and vary the lift of the rotors or to swing the frames in opposite directions to increase the pitch of the blades of either rotor and simultaneously decrease the pitch of the blades of the other rotor.

2. A helicopter comprising a frame provided at the bottom with landing wheels, an engine mounted on the rear portion of the frame, a pilot seat mounted on the forward portion of the frame, a gear case mounted for rocking movement about a transverse horizontal axis on the upper portion of the frame and in a vertical plane between the engine and the pilot seat, an angular beam fixed to the gear case and including a portion depending between the engine and the pilot seat and a portion extending forwardly beneath and beyond said pilot set, a tubular housing fixed on and rising from said gear case, concentric shafts rotatably mounted in said housing, gearing in said gear case for driving said shafts in opposite directions and including a drive shaft, a driving connection between said engine and said drive shaft, upper and lower rotors secured on the upper ends of said concentric shafts, and a hand-lever mounted on the frame beside the pilot seat and connected to the beam for rocking the gear case.

ROBERT C. SIGHTS.

REFERENCES CITED

The following references are of record in the file of this patent:

UNITED STATES PATENTS

| Number | Name | Date |
|---|---|---|
| 1,189,680 | Gardner | July 4, 1916 |
| 1,672,276 | Nordberg | June 5, 1928 |
| 1,272,846 | Perry | July 16, 1918 |
| 1,919,089 | Breguet et al. | July 18, 1933 |
| 2,256,918 | Young | Sept. 23, 1941 |